United States Patent [19]
Fletcher et al.

[11] 3,749,205
[45] July 31, 1973

[54] METAL SHEARING ENERGY ABSORBER

[76] Inventors: James C. Fletcher, Administrator of the National Aeronautics and Space Administration with respect to an invention of; Richard J. Fay; Edward P. Wittrock, both of Denver, Colo.

[22] Filed: Dec. 28, 1971

[21] Appl. No.: 212,977

[52] U.S. Cl. ................................ 188/1 C, 297/386
[51] Int. Cl. .............................................. F16f 7/12
[58] Field of Search ...................... 188/1 C; 293/70; 297/386

[56] References Cited
UNITED STATES PATENTS
3,232,383  2/1966  Son Moberg ...................... 188/1 C
3,532,380  10/1970  Studer et al. ................. 188/1 C UX FOREIGN PATENTS OR APPLICATIONS
1,105,404  12/1955  France ............................... 188/1 C

*Primary Examiner*—Duane A. Reger
*Attorney*—John R. Manning et al.

[57] ABSTRACT

A metal shearing energy absorber is disclosed comprising a flat thin strip of metal which is pulled through a slot in a cutter member of a metal, harder than the metal of the strip. The slot's length, in the direction perpendicular to the pull direction, is less than the strip's width so that as the strip is pulled through the slot, its edges are sheared off, thereby absorbing some of the pulling energy. In one embodiment the cutter member is a flat plate of steel, while in another embodiment the cutter member is U-shaped, with the slot at its base.

3 Claims, 6 Drawing Figures

PATENTED JUL 31 1973 3,749,205
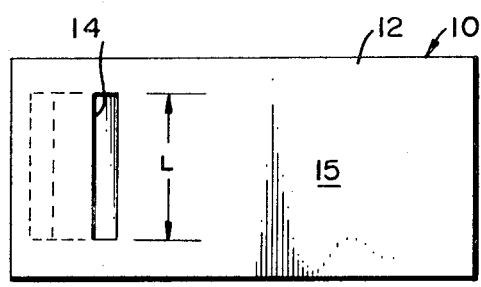
FIG. 1a
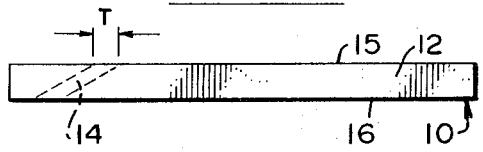
FIG. 1b
FIG. 2
FIG. 3
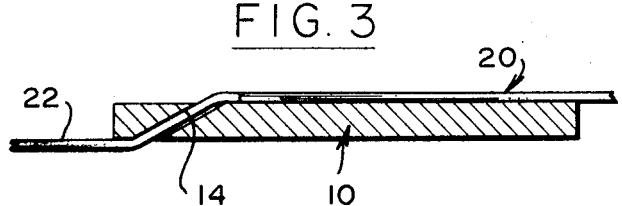
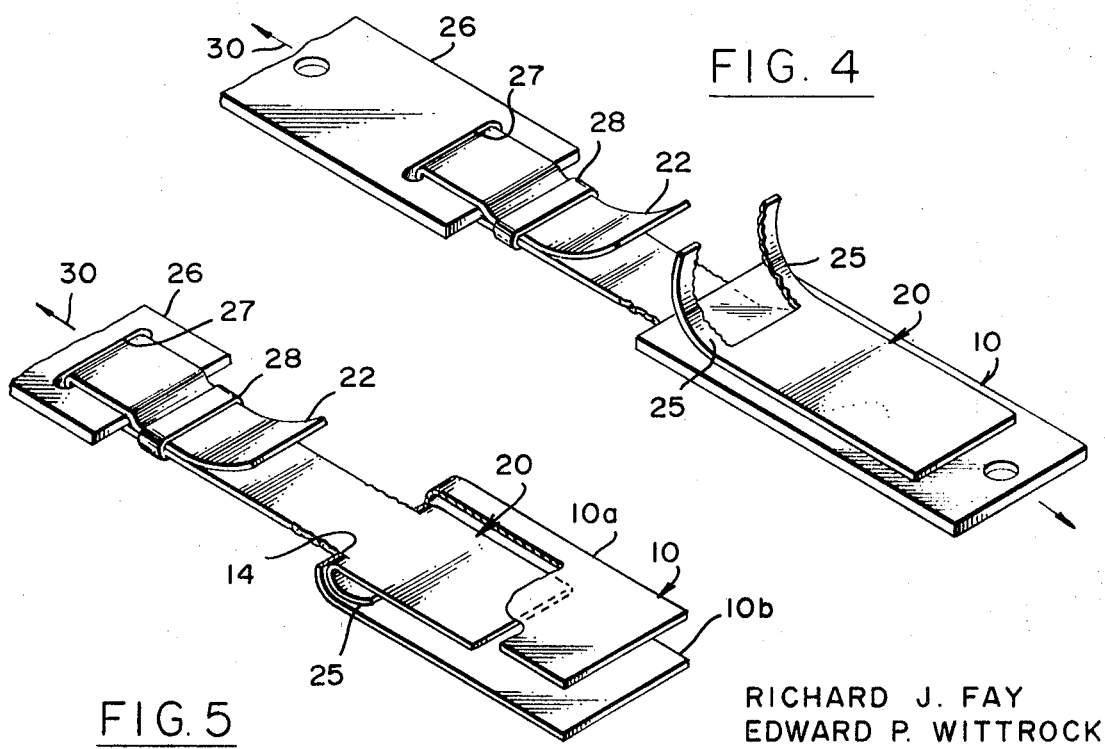
FIG. 4
FIG. 5
RICHARD J. FAY
EDWARD P. WITTROCK
INVENTORS
BY Paul F. McCaul
Monte F. Mott
ATTORNEYS

METAL SHEARING ENERGY ABSORBER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The present invention generally relates to energy absorbing devices and, more particularly, to a device which absorbs energy by metal shearing.

2. Description of the Prior Art:

There are many applications in which it is necessary to absorb energy. One example of such an application, is the seat belt. Various seat belts have been designed in which the energy is absorbed by shearing off or deforming metal strips. Most of the prior art metal shearing energy absorbers include a relatively large number of parts, which increase the cost of manufacturing and assembly, unnecessarily.

OBJECTS AND SUMMARY OF THE INVENTION

It is a primary object of the present invention to provide a new metal shearing energy absorber.

Another object of the invention is to provide a novel, simple, yet highly reliable metal shearing energy absorber.

A further object is to provide a new method of absorbing energy.

These and other objects of the invention are achieved by providing a device consisting of a thin strip of metal, such as aluminum, and a cutting member of a metal, harder than the strip metal, such as steel. The steel cutter is slotted, with the slot length being less than the strip's width. A leading end of the strip with a width not more than the slot length is inserted through the slot. As the strip is pulled through the slot by energy to be partially absorbed, the edges of the strip, which is wider than the slot length, are sheared, with energy being dissipated in the shearing of the metal strip. In one embodiment the metal cutter is a flat plate and in another embodiment the cutter is U-shaped.

The novel features of the invention are set forth with particularity in the appended claims. The invention will best be understood from the following description when read in conjunction with the accompanying drawings.

BRIEF DESCRIPTION OF THE DRAWINGS

FIGS. 1a and 1b are top and side views of one embodiment of a cutter member;

FIG. 2 is a top view of a metal strip of the type shearable by the cutter member of FIGS. 1a and 1b.

FIGS. 3 and 4 are cross-sectional and isometric views respectively of one embodiment of the invention; and FIG. 5 is an isometric view of another embodiment of the invention.

DESCRIPTION OF THE PREFERRED EMBODIMENTS

Attention is first directed to FIGS. 1a and 1b which are top and side views, respectively of a cutter member in accordance with one embodiment of the invention. The cutter member 10 is shown consisting of a flat plate 12 of a hard metal, such as steel. A slot 14 extends through the plate from its top side 15 to the bottom side 16. As shown in FIG. 1b, the slot 14 is preferably slanted. The length and width of the slot are designated by the letters L and T, respectively.

The novel metal shearing energy absorber of the present invention further includes a thin strip 20, shown in FIG. 2. Strip 20 is of a metal which is softer than the metal from which the cutter member 10 is fabricated, for example, aluminum. Strip 20 has a thickness which is not greater than the slot width T and except at a leading end 22 its width W is greater than the slot length L. At the leading end 22 the strip's width is never greater than L so that this end can be passed through the slot, as shown in FIG. 3.

In operation as the leading end 22 of strip 20 is pulled by energy to be partially absorbed, the strip is pulled through the slot 14. As the strip portion of the width W is encountered, since L<W, the edges of the strip 20 are sheared off by the slot's edges, thereby reducing the strip width to L. It is the shearing of the edges of metal strip 20 which dissipates the energy to be absorbed. The sheared edges of part of strip 22 are designated by numerals 25 in FIG. 4. Therein, the pulling is assumed to be performed by a pull tab 26 with a slot 27. A buckle 28 secures the strip leading end 22 to the pull tab 26. The direction of pull is designated by arrow 30.

From the foregoing it is thus seen that the novel metal shearing energy absorber of the present invention consists of a simple slotted cutter. The slot has a length which is less than the width of a metal strip which is to be pulled through the slot. By pulling on the strip its width is reduced to that of the slot length, which is achieved by the shearing off of the strip's edges, thereby absorbing the desired energy.

In another embodiment of the invention the cutter member is U-shaped, as shown in FIG. 5, with the slot 14 being located at the base of the U. Actually this type cutter member may be formed by drilling a hole at the center of a flat plate and thereafter bending it into the U shape. In this version the strip 20 is pulled through the slot between the two side walls 10a and 10b of the U-shaped member 10. It should be stressed that in this embodiment the sheared edges 25 curl or roll up within the U-shaped member as seen in FIG. 5, thereby further absorbing energy by plastic deformation. Therefore, the widths of the sheared off edges and the radius of the roll up have to be considered for a particular energy absorption application.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A metal shearing energy absorber comprising:
   a single flat metal plate defining first and second opposite flat sides and a slot of preselected length and width which extends through said plate from said first side to said second side; and
   an elongated strip of a material softer than said plate and of a thickness not greater than the width of said slot, said strip having a width, except at a leading end thereof, which is greater than the slot length, with the leading end strip width being not more than the slot length, whereby when said leading end passes through said slot and is pulled away from said plate, the strip width is reduced at both ends thereof to equal said slot length, with the ends beyond the reduced width being sheared off by said plate, as said strip is being pulled therethrough.

2. The arrangement as recited in claim 1 wherein said slot is slanted between said first and second sides in the direction in which said strip is pulled away from the slot.

3. A metal shearing energy absorber comprising:
a U-shaped metal member defining first and second spaced apart flat walls and a base therebetween and a rectangularly shaped slot of a preselected width and length, extending through said base with the width of said slot extending in a direction perpendicular to said spaced apart walls;
an elongated rectangularly shaped strip of a material softer than said member, the strip thickness being not more than the width of said slot and the strip width being greater than the slot length, except for a leading end of said strip which extends out of said member through said slot, whereby when the strip leading end is pulled away from said member, the strip width is reduced at both ends thereof to equal the slot length, with both ends of the strip beyond the slot length being sheared off by said member and tending to curl up between its opposite spaced apart walls.

* * * * *